United States Patent
Surawski et al.

(10) Patent No.: US 7,828,874 B2
(45) Date of Patent: Nov. 9, 2010

(54) ON-BOARD INERT GAS GENERATION SYSTEM WITH AIR SEPARATION MODULE TEMPERATURE CONTROL

(75) Inventors: Eric Surawski, Wethersfield, CT (US); Brigitte B. Falke, Union, CT (US); James P. Hurst, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 271 days.

(21) Appl. No.: 12/209,658

(22) Filed: Sep. 12, 2008

(65) Prior Publication Data

US 2010/0064886 A1 Mar. 18, 2010

(51) Int. Cl.
*B01D 53/22* (2006.01)
*B64D 37/32* (2006.01)

(52) U.S. Cl. .................. 95/14; 95/23; 95/54; 96/4; 244/135 R

(58) Field of Classification Search ........... 95/14, 95/23, 47, 54, 90; 96/4, 109, 112; 244/135 R
See application file for complete search history.

(56) References Cited

U.S. PATENT DOCUMENTS

| | | | |
|---|---|---|---|
| 4,556,180 A * | 12/1985 | Manatt | 244/135 R |
| 6,491,739 B1 * | 12/2002 | Crome et al. | 95/14 |
| 6,735,951 B2 | 5/2004 | Thompson | |
| 6,997,013 B2 * | 2/2006 | Jones | 62/655 |
| 7,172,156 B1 | 2/2007 | Jones | |
| 7,172,157 B2 | 2/2007 | Jones | |
| 7,175,692 B2 | 2/2007 | Schwalm | |
| 7,204,868 B2 * | 4/2007 | Snow, Jr. | 96/4 |
| 7,273,507 B2 | 9/2007 | Schwalm | |
| 7,300,494 B2 | 11/2007 | Schwalm et al. | |
| 7,374,601 B2 * | 5/2008 | Bonchonsky et al. | 95/138 |
| 2005/0223895 A1 * | 10/2005 | Wong | 95/148 |
| 2006/0021652 A1 | 2/2006 | Surawski | |

* cited by examiner

*Primary Examiner*—Frank M Lawrence
(74) *Attorney, Agent, or Firm*—Carlson, Gaskey & Olds, P.C.

(57) ABSTRACT

An on-board inert gas generation system is disclosed that includes an air separation module that is configured to produce nitrogen enriched air from a non-enriched air. The non-enriched air to the air separation module has a desired operating temperature range. A compressor system is in fluid communication with the air separation module. The compressor system is configured to rotate at a speed and provide the non-enriched air to the air separation module. A controller is in communication with the compressor system and is configured to reduce the speed in response to a parameter reaching an undesired value, which would result in a non-enriched air temperature that would exceed the desired operating temperature range. The reduced speed is selected to maintain the non-enriched air temperature within the desired operating temperature range.

12 Claims, 1 Drawing Sheet

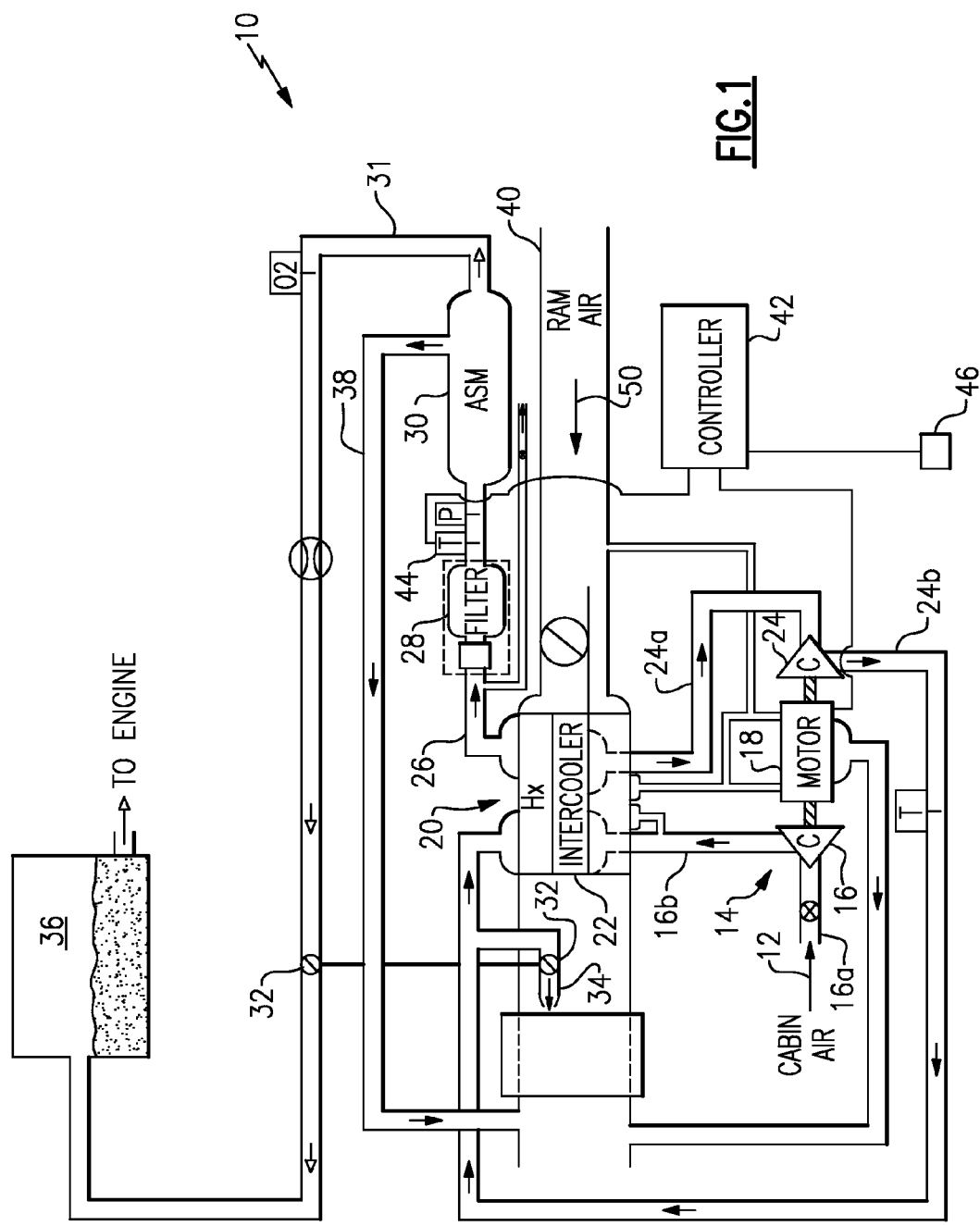

ON-BOARD INERT GAS GENERATION SYSTEM WITH AIR SEPARATION MODULE TEMPERATURE CONTROL

BACKGROUND

This disclosure relates to an on-board inert gas generation system for an aircraft. More specifically, the disclosure relates to a method and system for controlling a temperature of an air separation module within the system.

On-board inert gas generation systems are used in aircraft to provide inert gas to various locations within the aircraft, such as cargo areas or fuel tanks. In one prior art arrangement, the system includes two compressors arranged in series for providing non-enriched air to the air separation module. The air separation module produces nitrogen enriched air as the inert gas.

It is desirable to provide the non-enriched air to the air separation module within a desired operating temperature range to produce the nitrogen enriched air. A heat exchanger is typically arranged in a ram air duct in fluid communication between the compressors and the air separation module to cool the non-enriched air. The non-enriched air is cooled when ram air flows through the heat exchanger, thus maintaining the non-enriched air within the desired operating temperature range.

Some aircraft operating conditions would result in the non-enriched air reaching a temperature greater than the desired operating temperature range unless the non-enriched air entering the air separation module is cooled. For example, during conditions in which the temperature of the non-enriched air becomes undesirably hot, such as when the aircraft is on the ground and there is no airflow through the ram air duct, the non-enriched air must be cooled by other means. To this end, an approach has been used to cool the non-enriched air prior to reaching the air separation module by providing bleed air to an ejector that induces an airflow across the heat exchanger. The bleed air is supplied by either an engine or one of the compressors, which introduces inefficiencies to the aircraft.

What is needed is an efficient method and system to control the temperature of the air separation module.

SUMMARY

An on-board inert gas generation system is disclosed that includes an air separation module that is configured to produce nitrogen enriched air from a non-enriched air. The non-enriched air to the air separation module has a desired operating temperature range. A compressor system is in fluid communication with the air separation module. The compressor system is configured to rotate at a speed and provide the non-enriched air to the air separation module. A controller is in communication with the compressor system and is configured to reduce the speed in response to a parameter reaching an undesired value, which would result in a non-enriched air temperature that would exceed the desired operating temperature range. The reduced speed is selected to maintain the non-enriched air temperature within the desired operating temperature range.

These and other features of the disclosure can be best understood from the following specification and drawings, the following of which is a brief description.

BRIEF DESCRIPTION OF THE DRAWINGS

FIG. 1 is a schematic illustration of an example on-board inert gas generation system.

DETAILED DESCRIPTION

An on-board inert gas generation system 10 is depicted in FIG. 1 in a highly schematic fashion. The system 10 includes a compressor system 14 that receives cabin air 12, for example. The compressor system 14 includes a first compressor 16 that is driven by an electric motor 18, for example. The first compressor 16 can also be driven by a turbine or any other variable speed drive component. The first compressor 16 receives the cabin air 12 through an inlet duct 16a and provides compressed air to an intercooler 22 of a heat exchanger assembly 20 through an outlet duct 16b. The heat exchanger assembly 20 is arranged in a ram air duct 40 to receive ram airflow 50. The compressed air is cooled by the ram airflow 50 flowing through the heat exchanger assembly 20 before it is provided to a second compressor 24 through an inlet duct 24a. The second compressor 24 is also driven by the electric motor 18 in the example. It should be understood that only one compressor can be used in the system 10.

The second compressor 24 provides further compressed air to the heat exchanger assembly 20 through an outlet duct 24b. The further compressed air, which has been cooled by the heat exchanger assembly 20, is provided to a filter 28 through a duct 26. Non-enriched air flows through the filter 28 to an air separation module 30. The air separation module 30 provides nitrogen enriched air through a nitrogen enriched air duct 31 to a fuel tank 36, for example. Permeate from the air separation module 30 is discharged to the ram air duct 40 through a permeate duct 38, for example.

In one example, ganged valves 32 are arranged within the nitrogen enriched air duct 31 and an ejector 34 that is arranged within the ram air duct 40 and in fluid communication with the outlet duct 24b. The ganged valves 32 are movable in response to an input from an actuator (not shown). The ganged valves 32 are used to regulate the flow through the system 10 and prevent surge conditions of the first and second compressors 16, 24, for example.

As the air flows through the first and second compressors 16, 24, the temperature of the non-enriched air rises. When the aircraft is in flight, ram airflow 50 through the ram air duct 40 passes through the heat exchanger assembly 20 to ensure that the non-enriched air is within a desired operating temperature range, which corresponds to the temperatures at which the air separation module 30 produces nitrogen enriched air of a desired quality. In one example, the desired operating temperature range is 175° F.-205° F. (79° C.-96° C.). Under some conditions, such as when there is little or no ram airflow 50, the temperature of the non-enriched air or feed air entering the air separation module 30 can become greater than the desired operating temperature range. As a result, the temperature of the non-enriched air entering the air separation module 30 must be lowered to produce nitrogen enriched air of the desired quality.

A controller 42 is configured to reduce a speed of the electric motor 18 by sending a speed command signal to the motor 18 when a parameter reaches an undesired value, which would result in a non-enriched air temperature that would exceed the desired operating temperature range. The reduced speed is selected to produce compressed air having a lower temperature, which corresponds to non-enriched air having a temperature within the desired operating temperature range.

In one example, the parameter is a non-enriched air temperature near the air separation module 30. The controller 42 is in communication with a temperature sensor 44 that is associated with a temperature of non-enriched air entering the air separation module 30. If the temperature exceeds the desired operating temperature range, then the controller sends the speed command signal to the electric motor 18 to reduce the speed of the first and second compressors 16, 24, which results in a non-enriched air temperature within the desired operating temperature range.

In another example, the parameter is an air speed detected by the air speed sensor 46, which is indicative of the ram airflow 50 through the ram air duct 40. The controller 42 is also in communication with an air speed sensor 46. An undesired air speed is reached when there is insufficient ram airflow 50 through the heat exchanger assembly 20 to cool the non-enriched air temperature to within the desired operating temperature range. If the airspeed would result in a temperature that exceeds the desired operating temperature range, then the controller sends the speed command signal to the electric motor 18 to reduce the speed of the first and second compressors 16, 24, which results in a non-enriched air temperature within the desired operating temperature range. For example, an air/ground signal can be used to indicate that there is insufficient ram airflow 50, in which case the controller 42 sends the speed command signal to the electric motor 18.

Although an example embodiment has been disclosed, a worker of ordinary skill in this art would recognize that certain modifications would come within the scope of the claims. For that reason, the following claims should be studied to determine their true scope and content.

What is claimed is:

1. An on-board inert gas generation system comprising:
    an air separation module configured to produce nitrogen enriched air from non-enriched air, the air separation module having a desired operating temperature range;
    a compressor system in fluid communication with the air separation module, the compressor system configured to rotate at a speed and provide the non-enriched air to the air separation module; and
    a controller in communication with the compressor system, the controller configured to reduce the speed in response to a parameter reaching an undesired value that would produce a non-enriched air temperature that would exceed the desired operating temperature range, the reduced speed selected to maintain the non-enriched air temperature within the desired operating temperature.

2. The on-board inert gas generation system according to claim 1, wherein the compressor system comprises an electric motor in communication with the controller, which is configured to provide a speed command signal to the electric motor corresponding to the reduced speed.

3. The on-board inert gas generation system according to claim 2, wherein the compressor system includes first and second compressors coupled to the motor, at least one of the first and second compressors providing the non-enriched air.

4. The on-board inert gas generation system according to claim 1, comprising a heat exchanger arranged in fluid communication between the air separation module and the compressor system.

5. The on-board inert gas generation system according to claim 4, comprising a ram air duct housing the heat exchanger and configured to receive a ram airflow.

6. The on-board inert gas generation system according to claim 5, comprising an air speed sensor in communication with the controller and detecting an air speed corresponding to the parameter, the controller providing a speed command signal to the compressor system to reduce the speed in response to the undesired airflow corresponding to the undesired value.

7. The on-board inert gas generation system according to claim 1, comprising a temperature sensor in communication with the controller and detecting the non-enriched air temperature corresponding to the parameter, the controller providing a speed command signal to the compressor system to reduce the speed in response to the non-enriched air temperature corresponding to the undesired value.

8. The on-board inert gas generation system according to claim 1, wherein the desired operating temperature range is approximately 175° F.-205° F.

9. A method of managing a feed air temperature entering an air separation module comprising the steps of:
    detecting a parameter associated with a temperature of a non-enriched air for an air separation module;
    comparing the temperature to a desired operating temperature for the non-enriched air; and
    reducing a compressor speed if the temperature exceeds the desired operating temperature.

10. The method according to claim 9, wherein the parameter corresponds to an airflow across a heat exchanger.

11. The method according to claim 10, wherein the parameter is an air speed associated with an airflow through a ram air duct.

12. The method according to claim 9, wherein the parameter is a temperature of the non-enriched air near the air separation module.

* * * * *